United States Patent Office 3,517,483
Patented June 30, 1970

3,517,483
CHROMATOGRAPHIC TECHNIQUE
Jack B. Carmichael, Amherst, Mass., assignor to Dow Corning Corporation, Midland, Mich., a corporation of Michigan
Continuation-in-part of application Ser. No. 585,012, Oct. 7, 1966. This application Apr. 14, 1969, Ser. No. 853,229
Int. Cl. B01d 15/08
U.S. Cl. 55—67                        3 Claims

ABSTRACT OF THE DISCLOSURE

Solvent extracted polymers for use as the liquid film for gas-liquid chromatography to separate organic compounds. Removal of low molecular weight species results in more precise and exacting analyses and provides for an effective separation of high molecular weight materials. Illustrative of the solvent extracted polymer is a polydimethylsiloxane.

---

This invention is a continuation-in-part of application Ser. No. 585,012, filed Oct. 7, 1966, now abandoned, and relates to improved chromatographic techniques for purposes of analyzing organic compounds and more particularly to a method wherein the need for thermal preconditioning of the column is eliminated prior to analysis and a more efficient and superior separation of the material to be analyzed is obtained.

Conventional gas mixture component separation is generally achieved by passing a predetermined amount of sample-gas mixture through a body of granular particles, which body is commonly referred to as a column. The sample-gas mixture is passed through the column by means of a stream of carrier gas. The carrier gas may essentially push the sample through the column as in "displacement," or the carrier gas may essentially pull the sample through the column as in "elution."

The process described above is commonly termed chromatography. In chromatography or chromatographic analysis, each component in a given gas mixture has its own affinity with respect to a specific column material. Hence, each component will adsorb to that specific material for a time which is characteristic to it alone and to no other of the components. The period of time during which each component adsorbs to the column material is considered its retention time.

In a particular situation, such as at given temperature, flow rate and pressure, and with the same carrier gas, column, column condition, and the like, a component will possess repeatability with respect to its retention time. Since each sample component has this unique retention coefficient, it will remain a longer or shorter time in the column than the other components in the gas mixture. Eventually, all of the individual components in the mixture will be moved out of the column by the carrier gas. As each component emerges from the column, a detector device such as an electrical bridge type of dual thermal conductivity cell or the like may be used to measure its magnitude as against a reference condition in the conductivity cell. The output of the detector is in peaked curved form, wherein each peak may represent one component, and the quantity of each of the components is directly related to the area under its respective curve. Curve measurement may be made by integration or in some cases by computation on the basis of peak height.

The identity of each sample component is known by predetermination, so the location of its peak along a separation time axis is also known. Thus, the initial and final arrival times of the component curve at the detector, as well as the peak apex time, are known and employed in programming a chromatographic system. As such, the measurement accomplished by this system is one of relative quantity only, a percentage composition measurement representing the concentration of a component in a sample-gas mixture.

There are two general types of chromatographic analysis, i.e., gas-solid and gas-liquid. The gas-liquid type may be represented by "partition" chromatography, which involves the use of a granular separation column wherein the granules are covered with a liquid film. The carrier and sample gases are passed through the column with the sample gas components interacting with respect to the liquid film. Accordingly, this invention is concerned with gas-liquid chromatography.

In gas-liquid chromatography, the column is normally packed with a granulated material which has been coated with the liquid film. The liquid film is comprised of a suitable polymer that has been dispersed in an appropriate solvent before it is conveniently applied in any feasible manner to the granulated particles which serve as the packing material for the columns. Generally, after the particles have been coated, the solvent is substantially volatilized after which the column is ready for use.

Unfortunately, in prior art practices the polymer employed as the liquid film invariably contains low molecular weight species which inherently interfere with an effective analysis. For example, these undesirable low molecular weight species appear as peaks in the resulting chromatogram and hence, an efficient analysis is disrupted. To minimize these effects it has been necessary heretofore to remove the low molecular weight species by thermally preconditioning the column. Thermal preconditioning is achieved by heating the column to a relatively high temperature for prolonged periods of time, generally 24 to 48 hours or more. While thermal preconditioning occurs, the packing material in the column is necessarily subject to chemical and physical degradation.

It is an object of this invention to employ solvent extracted polymers for use as the liquid film for gas-liquid chromatography which contains substantially no low molecular weight species and thus, eliminates the need for thermal preconditioning of the column.

It is also an object of this invention to provide solvent extracted polymer in which low molecular weight species have been removed for use in gas-liquid chromatography which surprisingly results in a more precise and exacting analysis and provides for an effective separation of high molecular weight materials.

It is a further object of this invention to provide prepared columns for use in gas-liquid chromatography which possess a far longer serivce life than those heretofore available.

These and other objects will become readily apparent from a consideration of the following detailed description of the invention.

This invention relates to a chromatographic method for separating organic compounds, the improvement which comprises utilizing as the liquid film on the packing material of the column, a solvent extracted polymer which is substantially free of low molecular weight materials having a molecular weight of less than 4,000.

By the term "packing material" as employed herein, it is simply meant that a variety of commercially available materials such as Firebrick, diatomaceous earths, and the like which are normally used for chomatographic columns are perfectly suitable and operative in the present invention.

It is to be also noted that by the term "substantially free" is related above, it is merely meant that the polymer may contain minute or trace amounts of materials having a molecular weight of less than 4,000 without detrimental effect to the ultimate desired analysis.

Removal of the low molecular weight species from the polymers of this invention is achieved by any well-known solvent extraction method which is considered most applicable. For example, fractional precipitation using a poor solvent for the high molecular weight species or a Soxhlet extraction whereby the low molecular weight species are readily removed, among other like methods can be effectively employed to accomplish the purposes of this invention. In addition, the low molecular weight species which are present in the polymer can be extracted by fractionation employing a diffusion-type system. The diffusion-type system involves placing the polymer in contact with one side of a barrier membrane and placing a volatile nonreactive solvent in contact with the other side of the barrier membrane. Under this process, the diffusion rate is an inverse function of molecular size, the low molecular weight species diffusing more rapidly. This method of extraction is especially suitable for particularly high molecular weight polymers and is within the contemplation of this invention. The latter method of extraction is disclosed in U.S. application, Ser. No. 539,746, filed Apr. 4, 1966, now U.S. Pat. No. 3,440,264, issued Apr. 22, 1969. As related earlier, although the above and other like methods of extraction are satisfactory, it is expected that trace amounts, i.e., less than .05 percent of the total materials having a molecular weight of 4,000 or less may be present in the polymer, however, such a small quantity of these undesirable materials is not sufficient to deleteriously affect the objects of this invention.

Illustrative of the commercially available polymers that can be so treated and thus, are suitable for use in this invention are methylvinylsiloxane, dimethylsiloxane, trifluoropropylmethylsiloxane, copolymers of diphenylsiloxane and dimethylsiloxane, copolymers of phenylmethylsiloxane and dimethylsiloxane, butanediol adipate, polyglycols, diethylene glycol sebacate and neopentyl glycol sebacate, among numerous others.

Illustrative of the organic compounds which can be separated under the method noted herein includes, among others, dimethylcyclosiloxane mixtures, resorcinol, catechol, alkyl and aryl hydrocarbons, commercially available herbicides and pesticides, fatty acid esters, steroids, alkaloids, etc.

The invention will be further illustrated with reference to the accompanying drawings wherein.

In obtaining the above recordings the following operating conditions prevailed.

Figure 1:
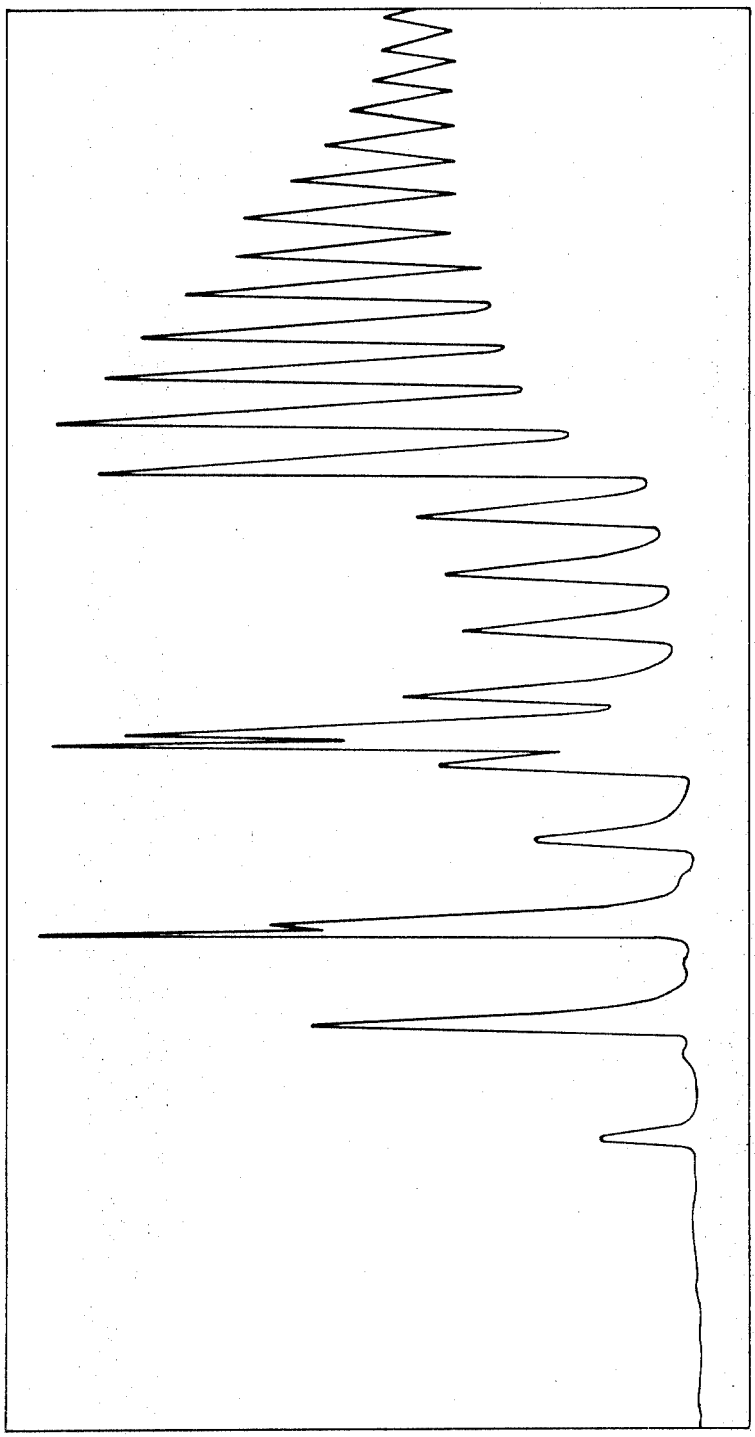
FIG. 1 is a reproduction of a representative strip chart recording in which an unextracted polymer was employed as the liquid film on the packing material of the column.
Figure 2:
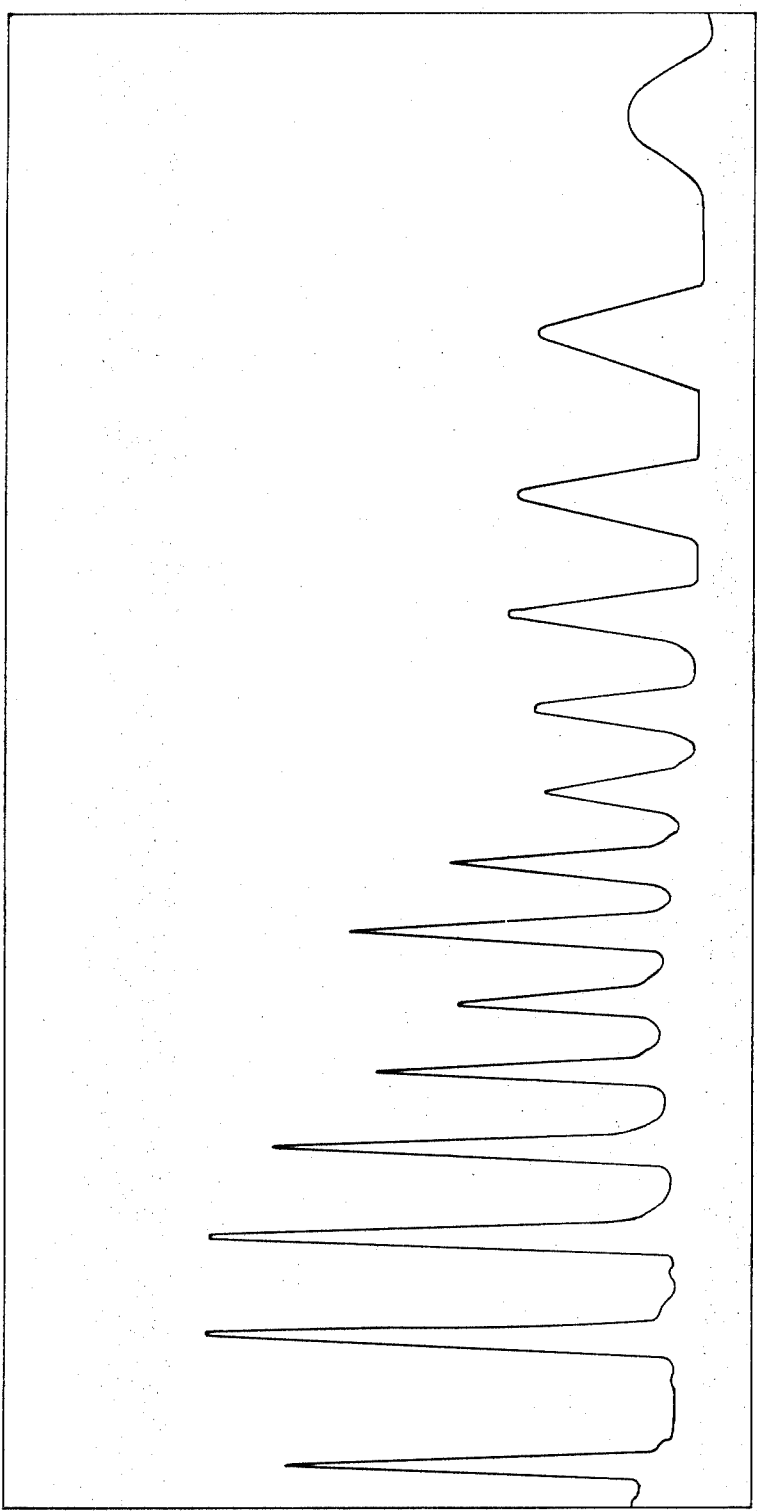
FIG. 2 is a reproduction of a representative strip chart recording in which an extracted polymer was employed as the liquid film on the packing material of the column.

| Conditions | Fig. 1 | Fig. 2 |
|---|---|---|
| Column | 2′ x ¼″ stainless steel. | 2′ x ¼″ stainless steel. |
| Liquid film | Unextracted dimethylpolysiloxane gum. | Extracted dimethylpolysiloxane gum. |
| Column temperature | 65° C.-400° C. | 50° C.-420° C. |
| Pressure | 40 p.s.i.g. H$_2$ | 40 p.s.i.g. H$_e$. |
| Sample | 18.5 ml. liquid | 10 ml. liquid. |
| Recorder | 0-1 mv. | 0-1 mv. |
| Chart speed | 1 in./min | 1 in./min. |
| Packing material | Diatomaceous earth | Diatomaceous earth. |

FIG. 1 represents a dimethylcyclosiloxane mixture that was analyzed using an unextracted liquid film on the packing material of the column. In contrast, FIG. 2 represents a dimethylcyclosiloxane mixture that was analyzed using an extracted liquid film on the packing material of the column. In comparison, it is clearly evident that FIG. 2 illustrates the important and notable improvements obtained in the analysis when the liquid film is extracted as defined herein. It is to be noted in FIG. 2 (extracted liquid film) that there is essentially no drift along the axis of the baseline whereas in FIG. 1 (unextracted liquid film) there is a marked drift exemplifying the fact that undesirable low molecular weight species are substantially interfering with a precise analysis. It is to be also noted that in FIG. 2 (extracted liquid film) the peaks return to the axis of the baseline resulting in the absence of a drift, indicative of the stability of the liquid film on the packing material of the column and showing a pronounced effectiveness in the analysis.

It is to be further noted that in FIG. 1 (unextracted liquid film), the last peak, reading from left to right, represents a compound of 27 siloxane units whereas in FIG. 2, the last peak represents a compound of 51 siloxane units. Translating these results illustrate the notable improvements obtained in chromatographic analysis when employing an extracted liquid film. This clearly indicates that when the liquid film is extracted, one is able to analyze higher molecular weight species which was not heretofore possible by prior art methods.

It is of extreme importance to still further note that the graph of FIG. 1 (unextracted liquid film) represents a column that has been thermally preconditioned. Therefore, it is to be emphasized that even when preconditioning the column, one is unable to approach the surprising and excellent results obtainable when the liquid film is extracted.

In the above table of operating conditions, other significant improvements are also obvious when using an extracted liquid film, less sample material for analysis is required and separation can occur at higher temperatures, thus confirming the increased effectiveness of the analysis.

When organic compounds such as an alkyl hydrocarbon, an aryl hydrocarbon, trimethylsilyl oleate, resorcinol, catechol, opium mixtures, cholestrol, and a commercially available herbicide and pesticide were substituted for the dimethylcyclosiloxane mixture noted above, equivalent results were obtained.

The invention has been described with reference to preferred embodiments, but it is to be understood that these are by way of illustration only. Accordingly, it is contemplated that modifications and variations can be made in the operating techniques without departing from the spirit of the invention.

That which is claimed is:

1. In a chromatographic method for separating organic compounds, the improvement which comprises utilizing as the liquid film on the packing material in the column, a solvent extracted polymer which is substantially free of low molecular weight materials having a molecular weight of less than 4,000.

2. The method as recited in claim 1 in which the solvent extracted polymer is of the unit formula:

in which R is a methyl, phenyl, vinyl or CF$_3$CH$_2$CH$_2$— radical and R′ is oxygen.

3. The method as recited in claim 1 in which the solvent extracted polymer is a polydimethylsiloxane.

References Cited

UNITED STATES PATENTS 3,169,389   2/1965   Green et al.   55—386 X
3,248,856   5/1966   Guillemin et al.   55—67

OTHER REFERENCES

Gas Chromatography Abstracts, 1965, 448, p. 89.
Gas Chromatography Abstracts, 1963, 769, p. 144.

J. L. DeCESARE, Primary Examiner